United States Patent [19]
Langley

[11] Patent Number: 5,782,394
[45] Date of Patent: Jul. 21, 1998

[54] MANUAL WELDING WIRE FEEDER

[76] Inventor: Thomas Guinn Langley, P.O. Box 4916, Breckenridge, Colo. 80424

[21] Appl. No.: 878,132

[22] Filed: Jun. 19, 1997

[51] Int. Cl.$^6$ ............................ B65H 20/00; B23K 9/28
[52] U.S. Cl. .................................. 226/187; 219/137.2
[58] Field of Search ........................... 226/181, 186, 226/187, 188, 127; 219/137.2

[56] References Cited

U.S. PATENT DOCUMENTS

| | | | |
|---|---|---|---|
| 2,272,158 | 2/1942 | Anderson | 226/186 X |
| 2,909,341 | 10/1959 | Kingsley | 226/186 X |
| 3,250,453 | 5/1966 | Halstead | 226/127 X |
| 3,279,669 | 10/1966 | Bernard et al. | 226/181 |
| 3,447,730 | 6/1969 | Jeannette | 226/187 X |
| 3,901,425 | 8/1975 | Taylor et al. | 226/181 X |
| 5,155,332 | 10/1992 | Maguire | 219/137.2 |

*Primary Examiner*—Michael Mansen

[57] ABSTRACT

A manual welding wire feed apparatus having a holder (2) shaped to fit the hand as would a pencil. A finger wheel (16) with two O-rings (18) operates by the tip of the index finger. The finger wheel rolls against an idler wheel (4) biased together by an outer elastic band (32).

8 Claims, 1 Drawing Sheet

MANUAL WELDING WIRE FEEDER

BACKGROUND—FIELD OF INVENTION

This invention relates to the welding arts, particularly machines to feed wire or rod to the seam being welded so as to supply seam filling metal thereto. Specifically, a handheld and operated wire or rod feeder is disclosed that is extremely comfortable, easy to use, lightweight, compact, and low in cost. That can use a wide range of wire diameters without the need to change any parts, can be used in either hand without any change of parts, allows for continuous feeding of the wire not discreet incremental advancement, improves wire tip stability at the weld pool even at relatively great distances from the weld, improves overall weld quality regardless of welder skill level, and fits in a pocket.

BACKGROUND—DESCRIPTION OF PRIOR ART

Materials may be joined together by welding them with an identical filler metal or brazing them with a different filler metal. The wire filler must be continuously advanced into the melt zone of the weld to supply fill metal as required.

Tungsten inert gas (TIG) as it is sometimes known, is an arc welding process wherein coalescence is performed by heating with an arc between a tungsten electrode and the work. The hot tungsten electrode, arc, and weld pool are shielded by an inert gas. Filler metal is added by feeding rod into the weld pool.

The main desirable feature of TIG welding is the high quality weld it is capable of making in almost all metals and alloys. It is used on alloys where freedom from atmospheric contamination is critical. TIG is especially adapted to welding thin sheet and small parts where the requirements for quality and finish are exacting. The ability to add filler metal independently of arc current with very low splatter is also a significant benefit. The major disadvantage of the TIG process is the requirement that the operator possess very high motor skills. The major skill being the ability to successfully feed the welding rod through the fingers in a smooth and continuous motion without removing the tip of the rod from the area of the shielding gas while keeping the hand sufficiently distant from the weld zone to prevent injury. Thereafter, inventors created several types of wire feeding machines for advancing filler to the seam being welded.

U.S. Pat. No. 1,377,792 to Rice discloses a simple tube to hold welding wire or rod with a finger operated friction lock to fix the wire in the tube until more wire is desired at which time the wire is simply grasped and slid further into the tube.

U.S. Pat. No. 3,999,697 to Hill describes a loop surrounding the user's index finger, with a movable feeder moving back and forth as the user's finger and thumb are squeezed together and released.

U.S. Pat. No. 5,155,332 to Maguire describes a wire feeder that fits in the palm of the hand with a thumb wheel that advances the wire through a telescoping guide tube.

U.S. Pat. No. 3,250,453 to Halstead, U.S. Pat. No. 3,252,645 to Zoltai, and U.S. Pat. No. 4,507,545 to Riordan all show solder wire feeders with wire engaging thumb wheels.

U.S. Pat. No. 4,206,862 to DaCosta describes a means for advancing coiled wire through a handpiece in response to a signal produced by a finger pressure-sensitive switch on the handpiece.

Although these machines all advance wire to the seam to be welded, all manual welding wire feeders heretofore suffer from a number of disadvantages.

(a) These prior art devices tend to be heavy and cumbersome.

(b) They assume that filler wire is of the coiled or spool type. For standard straight rigid rod they are impractical.

(c) They are complicated, comprising several parts to manufacture and thus costly.

(d) They fed the wire into the weld seam in a discreet increment, it is consumed and another discrete increment is fed into the weld seam.

(e) All except U.S. Pat. No. 3,999,697 require the rotation of a wheel by the thumb, thereby providing little control of the tip of the filler wire while actually advancing the wire.

A superior approach would be to feed the wire in a continuous fashion while welding the seam and allowing the user's hand to rest on the work piece without interfering with the process of advancing the wire.

OBJECTS AND ADVANTAGES

Accordingly, several objects and advantages of the present invention are:

(a) to provide a manual welding wire feeder which allows the hand feeding the wire to rest on the work piece;

(b) to provide a manual welding wire feeder which allows the operator to control the tip of the rod with great accuracy even at a long distance from the weld seam;

(c) to provide a manual welding wire feeder which can be used very close to the work piece;

(d) to provide a manual welding wire feeder which can be used with or without a work glove;

(e) to provide a manual welding wire feeder which eliminates virtually all waste of the welding rod;

(f) to provide a manual welding wire feeder which can be held with either hand with no changes whatever to the machine;

(g) to provide a manual welding wire feeder which can be carried in a shirt pocket and conveniently keep in a tool box (h) to provide a manual welding wire feeder which can be held in either hand in the same manner as an ordinary pencil or ink pen with no change in design.

Further objects and advantages are to provide a manual welding wire feeder requiring no special motor skills to advance wire, which can be used easily and conveniently, and inexpensive to manufacture. Still further objects and advantages will become apparent from a consideration of the ensuing description and drawings.

Figure 1:
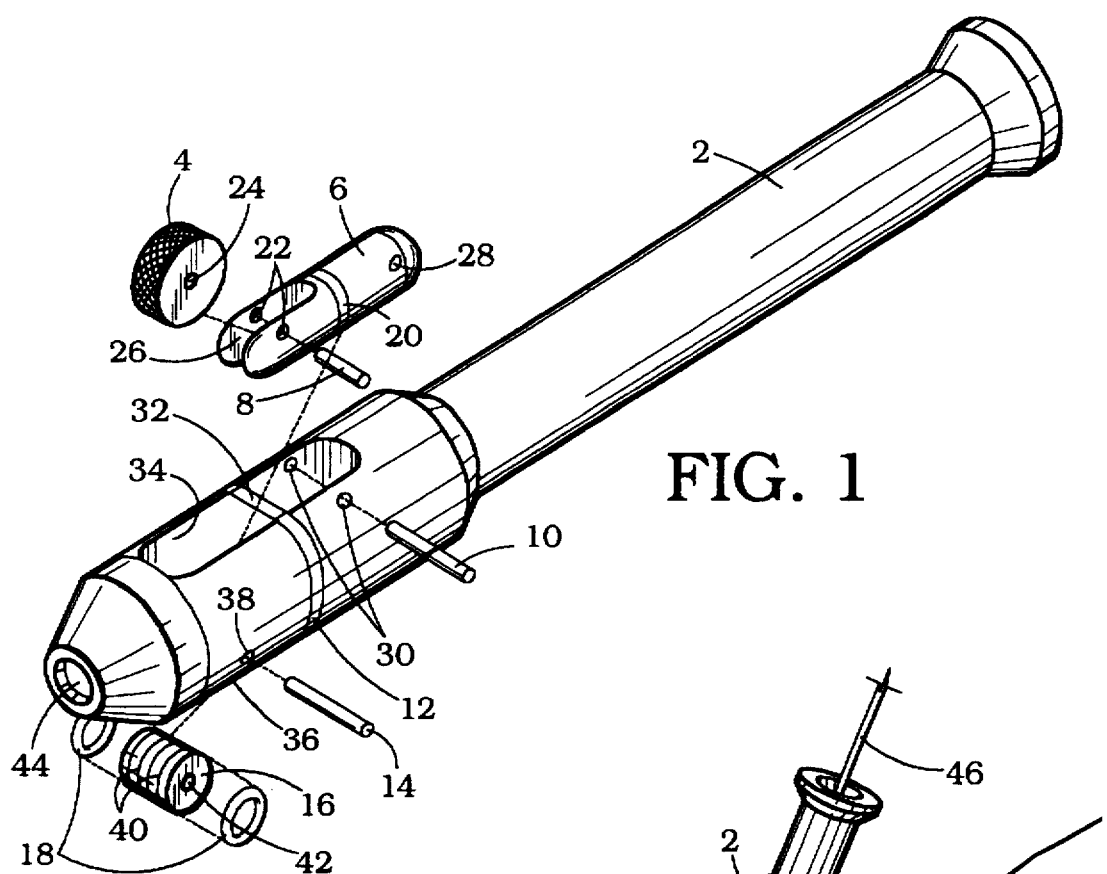
FIG. 1 shows an isometric exploded view of the present embodiment of the invention.

A typical embodiment of the invention is illustrated in FIG. 1. The wire feeder has a holder 2 of cylindrical cross section consisting of machinable material. A opening 34 is in holder 2 at the foreword end of the holder 2 to a depth one-half the diameter of the holder 2. Holes 30 are drilled into the holder 2 perpendicular to the opening 34. A opening 36 (not shown) is on the opposite side of opening 34 to a depth of one half of the diameter of holder 2. A hole 38 is drilled into the holder 2 perpendicular to the opening 36. A groove 12 is in holder 2 perpendicular to the plane of opening 34 around the circumference of holder 2. A longitudinal through-hole 44 of predetermined diameter allowing the larger of the available welding wires to pass through is drilled through the center of the holder 2. A idler wheel 4, consisting of machinable material is inserted into slot 26 in lever 6 and is secured by shaft 8 which is inserted into holes 22 in lever 6 and hole 24 in idler wheel 4 allowing idler wheel 4 to rotate freely on shaft 8. Lever 6 consisting of machinable material is inserted into opening 34 and is secured by shaft 10 which is inserted into holes 30 in holder 2 and hole 28 in lever 6 allowing lever 6 to pivot freely on shaft 10. Elastic band or rubber O-ring 32 is inserted into groove 12 in holder 2 which aligns with groove 20 in lever 6 applying tension on lever 6. Rubber O-rings 18 are inserted into grooves 40 in finger wheel 16. Finger wheel 16 consisting of machinable material is inserted into opening 36 (not shown) and is secured by shaft 14 which is inserted through holes 38 in holder 2 and hole 42 in finger wheel 16 allowing finger wheel 16 to rotate freely on shaft 14.

The holder 2 is typically 5 inches to 6 inches in length and approximately ½ inches to ⅝ inches in diameter. The idler wheel 4 is typically of small diameter approximately ⅝ inches in diameter. The finger wheel is typically of small diameter approximately ¼ inches in diameter.

From the description above, a number of advantages of my wire feeder become evident.

(a.) The unit can be used in either hand with no change in configuration.

(b.) The pivoting lever allows various diameter wires to be used in the unit without changing costly and complex parts.

(c.) It is extremely comfortable, lightweight and compact.

(d.) It allows for continuous feeding of the wire, not discreet incremental feeding.

(e.) It improves the wire tip stability at the weld pool even at relatively great distances from the weld.

(f.) It has been proven that it improves overall weld quality regardless of welder skill level.

(g.) It requires no special motor skills to successfully advance filler wire and achieve very high quality welds.

(h.) It fits in your pocket.

OPERATION—FIG. 2

Figure 2:
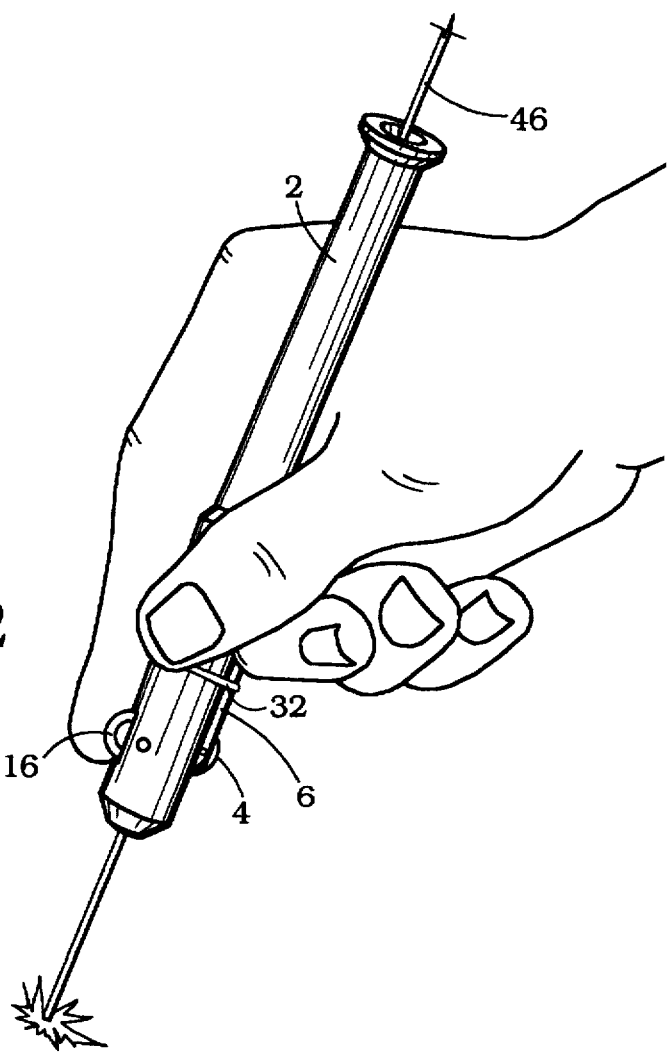
FIG. 2 shows a perspective view of the present embodiment of the invention.

In use, the wire feeder is held in the hand similar to holding a pencil. Looking at FIG. 2, the holder 2 is held in the "V" formed by the thumb and index finger. The tip of the index finger rests on top of the finger wheel 16. Holder 2 is placed in the hand so the lever 6 and idler wheel 4 are not encumbered by the user's hand. The filler wire 46 is inserted in the back of the holder 2 and pushed forward. The filler wire 46 engages the idler wheel 4 forcing it to pivot up on lever 6 and urging the idler wheel against the filler wire by the elastic band 32. As the wire is further advanced it is captured between the two O-rings 18 on finger wheel 16, which centers and applies frictional engagement for the filler wire. The wire is advanced by placing the tip of the index finger on top of the finger wheel 16 and moving the tip of the index finger in a backward movement.

SUMMARY, RAMIFICATIONS AND SCOPE

Accordingly, the reader will see that the wire feeder can be used to feed filler wire in a continuous manner regardless of which hand a user chooses. Wires of very small diameter used on delicate work can be held very close to the melt zone by the welder allowing for greater precision in the welding operation. In addition the simplicity of this design allows wire to be changed instantly with no loss of time or need for expensive interchangeable parts. Rigid welding wires can now be used completely with almost no waste resulting in substantial savings. Its ergonomic design eliminates possible medical problems associated with awkward, heavy palm held devices. It offers greater precision and quality in manual welding procedures by helping the user keep the melting tip within the shielded weld pool area. Furthermore, it minimizes the need for long and expensive training programs designed to teach users complex motor skills required to hand feed welding wire. In addition, it fits into your pocket making it available at all times in any welding situation.

Although the description above contains many specifications, these should not be construed as limiting the scope of the invention but as merely providing illustrations of some of the presently preferred embodiments of this invention. For example, the holder can have other shapes. The idler wheel can be urged against the wire by other means such as a helical coiled spring, etc.

Thus the scope of the invention should be determined by the appended claims and their legal equivalents, rather than by the examples given.

I claim:

1. A hand held wire feeder comprising in combination:

a elongated holder having a longitudinal through-hole, a groove and a plurality of openings and having a size adapted to fit between a users thumb and index finger;

a finger wheel mounted inside a first opening of said openings on said holder and adapted to roll by movement of the tip of the index finger;

a lever mounted inside a second opening of said openings on the holder, said lever having a idler wheel mounted in a slot on one end of said lever disposed to roll against a welding wire, a groove and an elastic band disposed in said groove on said lever and in said groove on said holder the idler wheel being urged against the wire by said elastic band whereby a plurality of welding wires with differing diameters can be fed to a weld seam by movement of the tip of the index finger.

2. The feeder of claim 1, wherein said holder is made of a machinable material.

3. The feeder of claim 2, wherein said idler wheel is made of a machinable material.

4. The feeder of claim 3, wherein said finger wheel is made of a machinable material.

5. The feeder of claim 4, wherein the finger wheel having two grooves about its periphery and two rubber O-rings, said grooves providing positions for said two rubber O-rings to center and grip welding wire of varying diameters.

6. The feeder of claim 5, wherein the elastic band is a rubber O-ring.

7. The feeder of claim 6, wherein the idler wheel has a knurled surface.

8. The feeder of claim 1, wherein the lever is pivotally mounted inside said second opening.

* * * * *